UNITED STATES PATENT OFFICE.

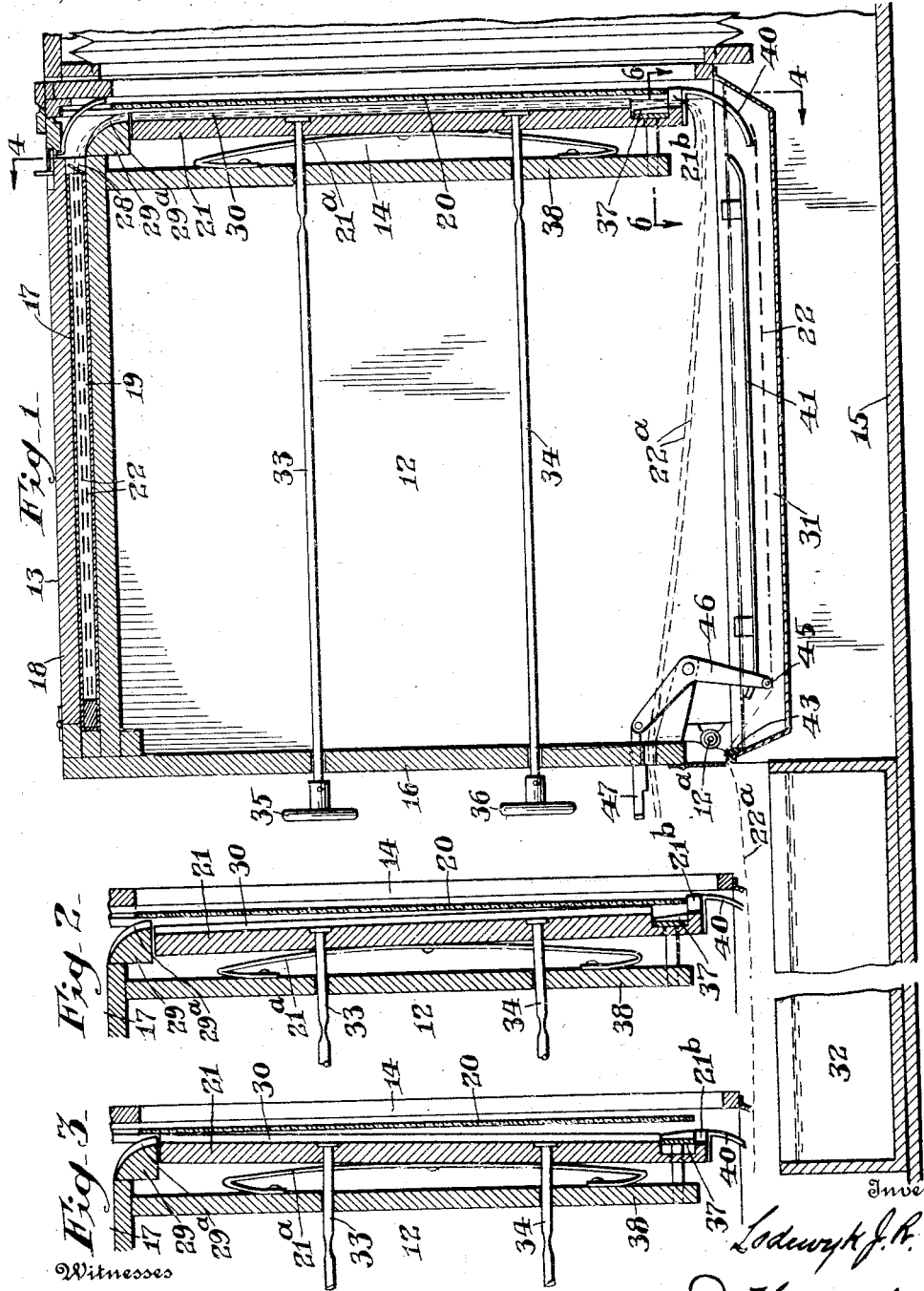

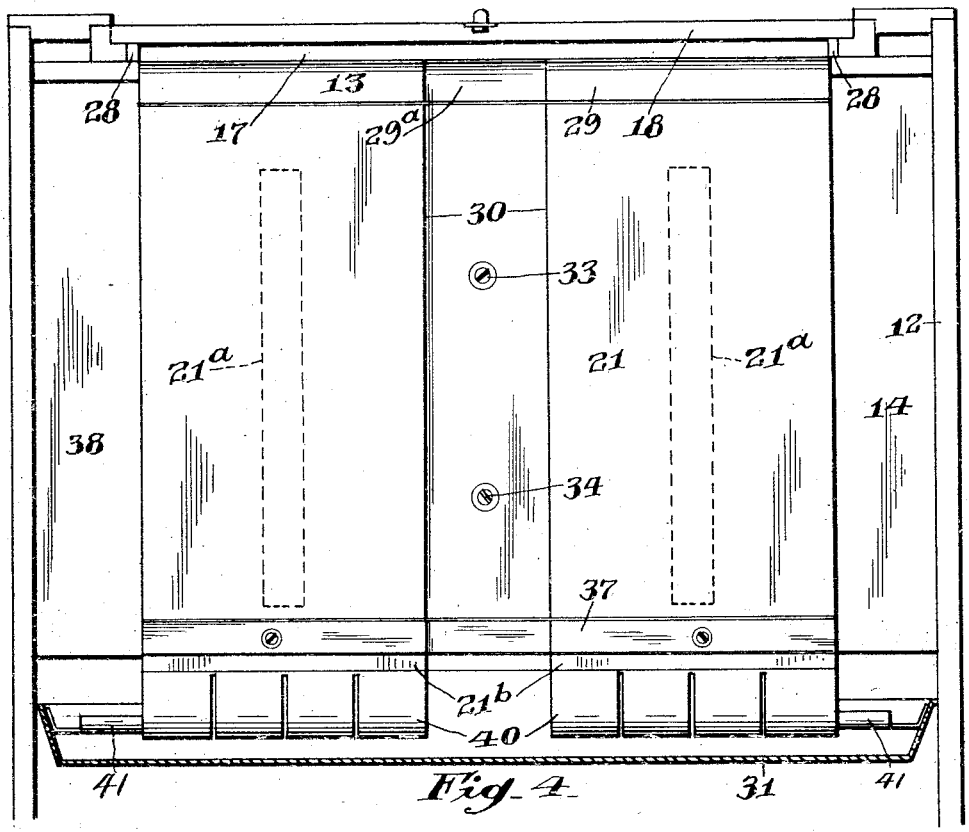
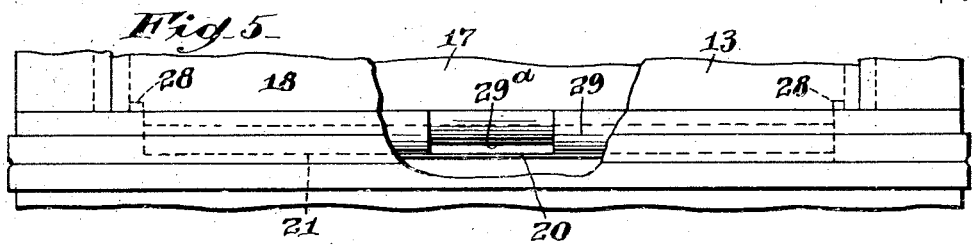
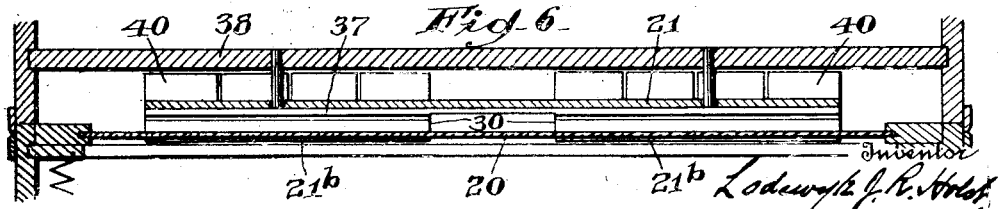

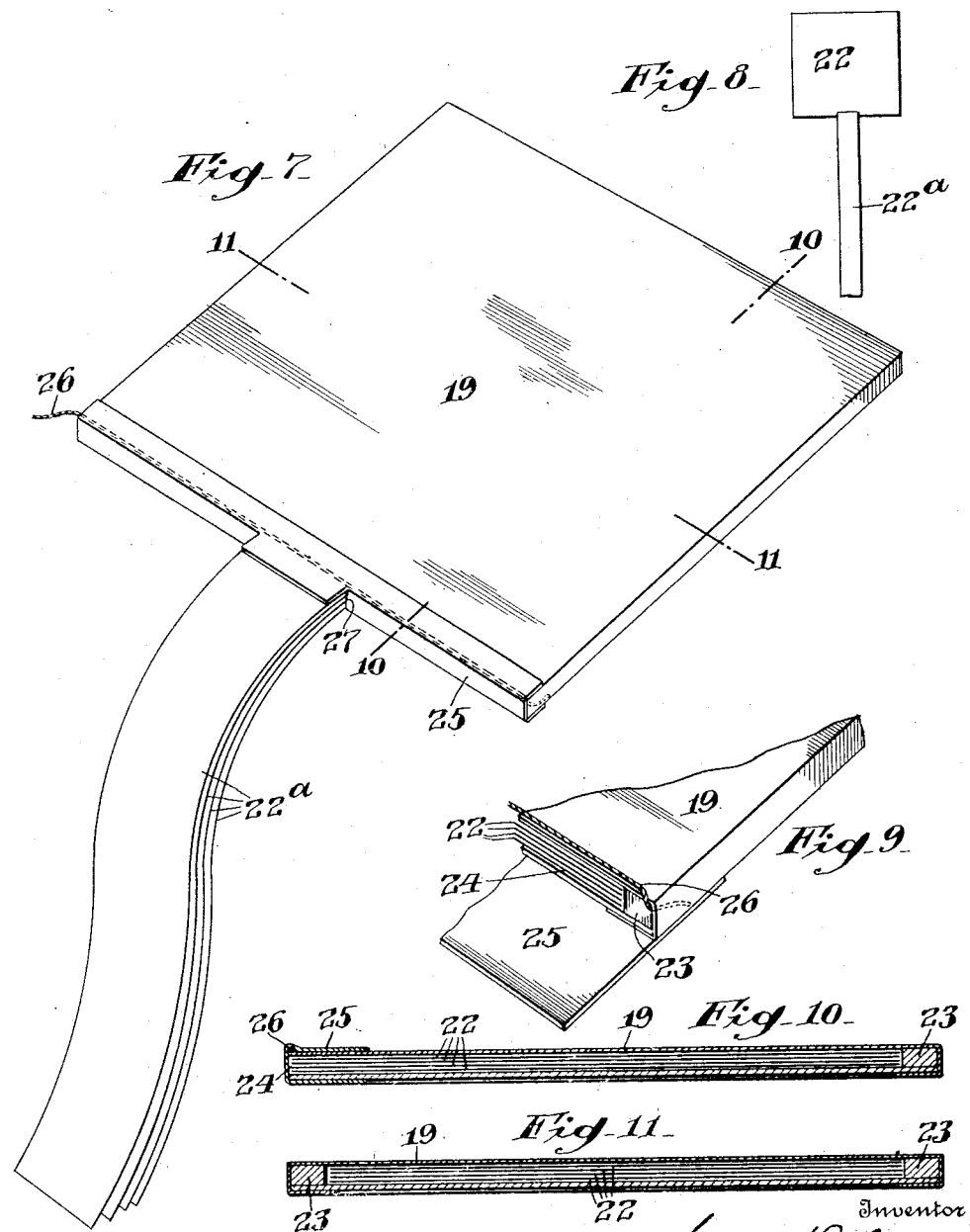

LODEWYK J. R. HOLST, OF PHILADELPHIA, PENNSYLVANIA, ASSIGNOR TO WILLIAMS, BROWN AND EARLE, INC., OF PHILADELPHIA, PENNSYLVANIA, A CORPORATION OF PENNSYLVANIA.

MAGAZINE FILM-HOLDER FOR CAMERAS.

1,208,558.  Specification of Letters Patent.  Patented Dec. 12, 1916.

Application filed August 21, 1915. Serial No. 46,648.

*To all whom it may concern:*

Be it known that I, LODEWYK J. R. HOLST, a citizen of the United States, residing at the city of Philadelphia, in the county of Philadelphia and State of Pennsylvania, have invented certain new and useful Improvements in Magazine Film-Holders for Cameras, of which the following is a specification.

My invention relates to a magazine film holder for cameras wherein a series of cut sheets of sensitized material is adapted singly to be moved into the focal plane of the camera with means to hold the same in a smooth or flat condition during exposure and such means adapted to permit of the release of the previously exposed sheet from the camera; and in such connection the said invention relates more particularly to the constructive arrangement of such an appliance and manipulations of the same for the defined purposes.

The nature, scope and characteristic features of my present invention will be more fully understood from the following description taken in connection with the accompanying drawings forming part hereof, in which—

Figure 1, is a vertical sectional view through a photographic copying camera, embodying main features of my said invention in its particular adaption to a magazine containing cut sheets of sensitized material, each provided with a manipulating tab for withdrawing singly from the magazine and exposing in the focal plane of the camera; and also showing means for supportingly holding each cut sheet in said focal plane and for allowing of withdrawal of the same after exposure, from the camera. Fig. 2, is a fragmentary sectional view of the front portion of the camera, showing the pressure-board tilted backward at the top for introduction of a cut sheet of sensitized paper, cloth or other material between the pressure-board and plate-glass of the camera and in the focal plane thereof. Fig. 3, is a fragmentary sectional view similar to Fig. 2, showing the pressure-board tilted backward at the bottom so as to allow of withdrawal of an exposed sheet of sensitized paper or other material after exposure in the focal plane of the said camera. Fig. 4, is a view in section on the line 4, 4 of Fig. 1, showing the pressure-board, in elevation. Fig. 5, is a fragmentary plan view of the front portion of the camera, broken away, to show the position of the plate-glass with respect to the pressure-board of the camera. Fig. 6, is a sectional view on the line 6, 6 of Fig. 1, showing means for maintaining the cut-sheet of sensitized material in the focal-plane of the camera and means arranged to be manipulated to withdraw the cut sheet after exposure, in the focal plane of the said camera. Fig. 7, is a perspective view of the magazine arranged for containing a pack of cut sensitized sheets, each provided with a manipulating tab and said magazine provided along one edge with a pull string to part the flap so as to permit of the ready release singly of each such cut sheet from the magazine. Fig. 8, is a plan view of one of the cut sheets of sensitized material with its manipulating tab, the said sheet being shown removed from the magazine therefor. Fig. 9, is a fragmentary perspective view of one of the front corners of the magazine with the flap of the magazine shown unsealed; and Figs. 10 and 11, are respectively, sectional views on the lines 10, 10 and 11, 11 of Fig. 7.

Referring to the drawings 12, represents the body of the camera.

13, is the top of the camera, 14 is the front, 15 is the base, and 16 is the back thereof. The top 13, comprises a light-proof chamber 17, having a hinged door 18, to permit of mounting of the filled magazine 19 therein. The body 12, of the camera for facilitating the placing of the magazine 19, containing the cut sensitized sheets, is arranged with a hinge connection at $12^a$, so as to allow of being readily tilted into a vertical position for the said purpose. The front 14, is arranged with plate glass 20, in the focal plane of the camera and rigidly secured thereto. Adjacent to the plate glass 20, is arranged a manually movable pressure-board 21, contacting with said glass and adapted to supportingly hold in a smooth flat condition a cut sheet of sensitized paper, cloth or other material 22, released from the magazine 19, by means of a tab $22^a$, and in the focal plane of the camera, in which plane the said sheet is exposed.

The magazine 19, as shown is of rectangular form and consists of an internal framework 23, with a surrounding covering and having the front arranged with an open end 24 closed by an overlapping flap 25, as clearly illustrated in Fig. 7. Along one front edge of the magazine is provided a pull string 26, to part this edge, to permit of the free release singly of cut sheets of sensitized paper, cloth or other material 22, contained in the magazine by means of tabs 22$^a$, and at the same time, without in the withdrawing of the sheets fogging the remaining sheets, due to the fact that the parted flap owing to its resilient character closes in against the front end of the said magazine. The overlapping flap 25, is offset in the center at 27 and is secured to the uppermost tab 22$^a$ of the series, as clearly shown in Fig. 7, so that when the magazine is in its sealed condition, the sheets will be protected and when the flap has been parted and the magazine is mounted in the light proof chamber 17, it will make no difference then whether the said flap completely closes the front end of the magazine or not, as the light proof chamber cover 18, will protect the retained sheets of the magazine 19, against light exposures. In the light proof chamber 17 are arranged stops 28, to contact with the front ends of the framework of the magazine 19, to hold it firmly within said chamber and at the same time to permit of the free release of the same by a tab 22$^a$ connected with each sheet, as required. At the top of the camera body is provided a curved block 29, extending crosswise of said body and having a central groove 29$^a$, for guiding and housing the tabs 22$^a$, and around which block the sheets from the magazine are drawn by the tabs. The series of tabs 22$^a$, of the respective sensitized sheets 22, of the magazine 19, are passed through a groove 30, arranged in the pressure-board of the camera and these tabs are long enough to extend beyond the back of the camera, as clearly shown in Fig. 1, so that by pulling on the lowermost tab, the released sensitized sheet from the magazine 19, exposed in the focal plane of the camera can thus be readily withdrawn from the camera, into respectively developing and fixing baths 31 and 32, as clearly shown in Fig. 1. The pressure-board 21, is provided with longitudinal rods 33 and 34, extending through the back of the camera provided with handling means 35 and 36, for respectively operating the said rods. Through the tension of a pair of bow-springs 21$^a$ in rear of the said pressure-board 21, the latter is held normally in close contact with the plate glass 20. When the upper rod 33 is operated by its handling device 35, a space between the said glass and pressure-board will be provided to thereby enable passing of a cut sensitized sheet from the magazine 19, into the focal plane of the camera, while the bottom portion of the said board will be in contact with the plate glass 20, so that to advance the exposed sheet beneath the said focal plane by pulling on its tab, the handling device 36 of the rod 34, must be operated against the normal tension of the spring 21$^a$, under which held, to cause said pressure-board to be drawn backwardly at the bottom and outwardly at the top, and at the same time the pusher 37 rigidly connected with a vertical strip 38, as part of the camera frame-work, holds the sheet in such position that when the pressure-board is moved backward the bottom ledge 21$^b$ thereof, will be moved out of the path of travel of the sheet of paper or other sensitized material, thus allowing it to pass freely around the curved corner guide 40, and beneath the plates 41, arranged in a developing bath 31, to thereby insure complete submersion face down of the said previously exposed sheet in said bath. The sheet then passes over a squeegee 43, for removing surplus developing chemicals therefrom and the sheet passes then into a fixing bath 44, to complete treatment of the sensitized sheet for subsequent use. With respect to the lowermost tab 22$^a$, it is guided underneath a transversely supported pin 45, Fig. 1, by the operating of a bell crank lever 46, and a trigger 47, and the same securely held in the two extreme positions of its course. It is in its uppermost position, when a sheet of sensitized material is to be drawn into the focal plane of the camera, and by means of the trigger 47, the pin 45, will be brought into its lowermost position to permit of the guiding of the tab, during the pulling of an exposed sheet into the said developing tank 31.

It will be observed from the foregoing description that the manipulating tabs of the sensitized paper, cloth or other material will pass around the front of the camera in the grooves 29$^a$ and 30, provided therefore, without interfering with the maintenance of the sheet in smooth flat condition while being withdrawn from the magazine and while passing between the pressure-board 21 and glass plate 20, into the focal plane of the camera to be exposed. This is very desirable as well as important so as not to affect the character or clearness of the sheet due to exposure in said focal plane.

It will be understood that the magazine in its sealed condition is mounted in the light proof chamber 17, and the front end overlapping flap 25, is then parted by the pull string 26, and the lid of the said chamber closed down, when by means of a manipulating tab 22$^a$, a sheet of the sensitized paper or other material 22, is released from the magazine and drawn in the manner hereinbefore explained into the focal plane of the camera for being exposed and afterward released and developed as already clearly explained and for what purpose.

Having thus described the nature and objects of my invention, what I claim as new and desire to secure by Letters Patent is:—

1. A camera having a glass plate located in its focal plane and a light proof chamber located in the rear thereof, said chamber having a supporting strip with a spring plate located in the rear of said glass plate, a pressure board supported by said strip and spring plate, longitudinal rods extending rearwardly from said pressure board through the back wall of said chamber, whereby said pressure board may be retracted, a film pack mounted in said chamber and containing a series of cut films, each of said films being provided with a manipulating tab, extending to the exterior of said chamber, whereby it may be withdrawn from said film pack into a position between said pressure board and said glass plate for exposure and then withdrawn from said exposure position.

2. A camera having a glass plate located in its focal plane and a light proof chamber located in the rear thereof, said chamber having a supporting strip with a spring plate located in the rear of said glass plate, a pressure board supported by said strip and spring plate, a pusher located in one part of said strip and projecting through said pressure board, longitudinal rods extending rearwardly from said pressure board through the back wall of said chamber, whereby said pressure board may be retracted, a film pack mounted in said chamber and containing a series of cut films, each of said films being provided with a manipulating tab, extending to the exterior of said chamber, whereby it may be withdrawn from said film pack into a position between said pressure board and said glass plate for exposure and then withdrawn aided by said pusher from said exposure position.

3. A camera having a glass plate located in its focal plane and a light proof chamber located in the rear thereof, said chamber having a supporting strip with a spring plate located in the rear of said glass plate, a pressure board supported by said strip and spring plate, a pusher located in one part of said strip and projecting through said pressure board, a guide connected with said pressure board, longitudinal rods extending rearwardly from said pressure board through the back wall of said chamber, whereby said pressure board may be retracted, a film pack mounted in said chamber and containing a series of cut films, each of said films being provided with a manipulating tab, extending to the exterior of said chamber, whereby it may be withdrawn from said film pack into a position between said pressure board and said glass plate for exposure and then withdrawn from said exposure position aided by said pusher and guide.

In witness whereof, I have hereunto set my signature in the presence of the two subscribing witnesses.

LODEWYK J. R. HOLST.

Witnesses:
THOMAS M. SMITH,
THEODORE ROSEMANN.

Copies of this patent may be obtained for five cents each, by addressing the "Commissioner of Patents, Washington, D. C."